United States Patent [19]

Crouch

[11] 3,916,558
[45] Nov. 4, 1975

[54] COUPLING DEVICE FOR A SECTIONAL MINNOW TRAP

[75] Inventor: Lindsley B. Crouch, Fillmore, N.Y.

[73] Assignee: Cuba Specialty Mfg. Co., Inc., Houghton, N.Y.

[22] Filed: Dec. 18, 1974

[21] Appl. No.: 533,858

[52] U.S. Cl.................................. 43/65; 43/100
[51] Int. Cl.²......................................... A01K 69/06
[58] Field of Search .................. 43/65, 100; 285/67

[56] References Cited
UNITED STATES PATENTS

| | | | |
|---|---|---|---|
| 798,670 | 9/1905 | Gee........................................ | 43/65 |
| 897,589 | 9/1908 | Connevey............................... | 43/65 |
| 2,076,972 | 4/1937 | Tucker.................................... | 43/65 |
| 3,387,403 | 6/1968 | Crouch................................... | 43/65 |

Primary Examiner—Robert Peshock
Assistant Examiner—Daniel J. Leach
Attorney, Agent, or Firm—Sommer & Sommer

[57] ABSTRACT

An improved coupling device for a Gee-type sectional minnow trap includes a first ring attached to the divergent marginal end portion of one trap half, and a second ring attached to the adjacent divergent marginal end portion of the other trap half. Each ring has a hook member arranged at one circumferential location, and has a through-slot arranged diametrically opposite its hook member and adapted to receive interlockingly the hook member of the other ring. The hook member of each trap half may be passed through the complementary slot provided in the other trap half to join the halves in an axially aligned relationship, and may be retained in this position by a conventional snap fastener.

6 Claims, 7 Drawing Figures

U.S. Patent  Nov. 4, 1975  Sheet 1 of 2  3,916,558
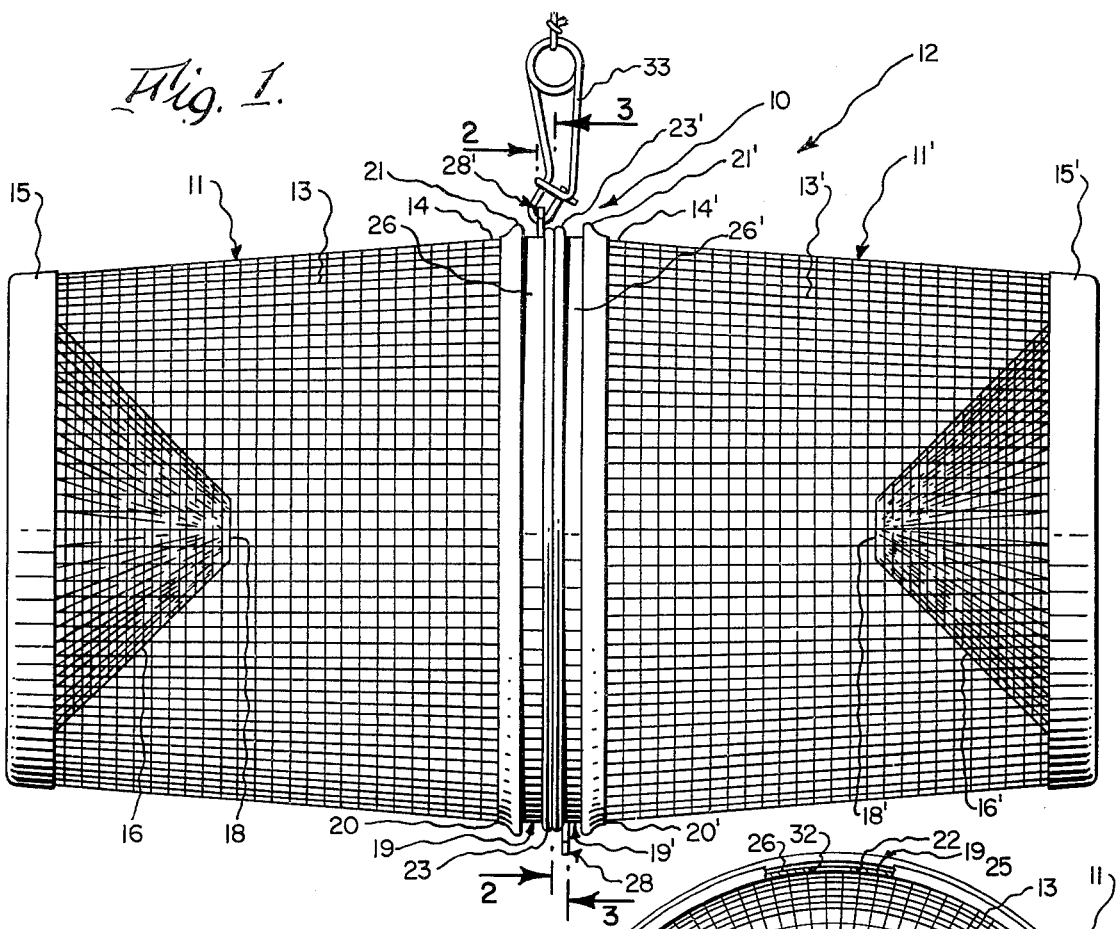
Fig. 1.
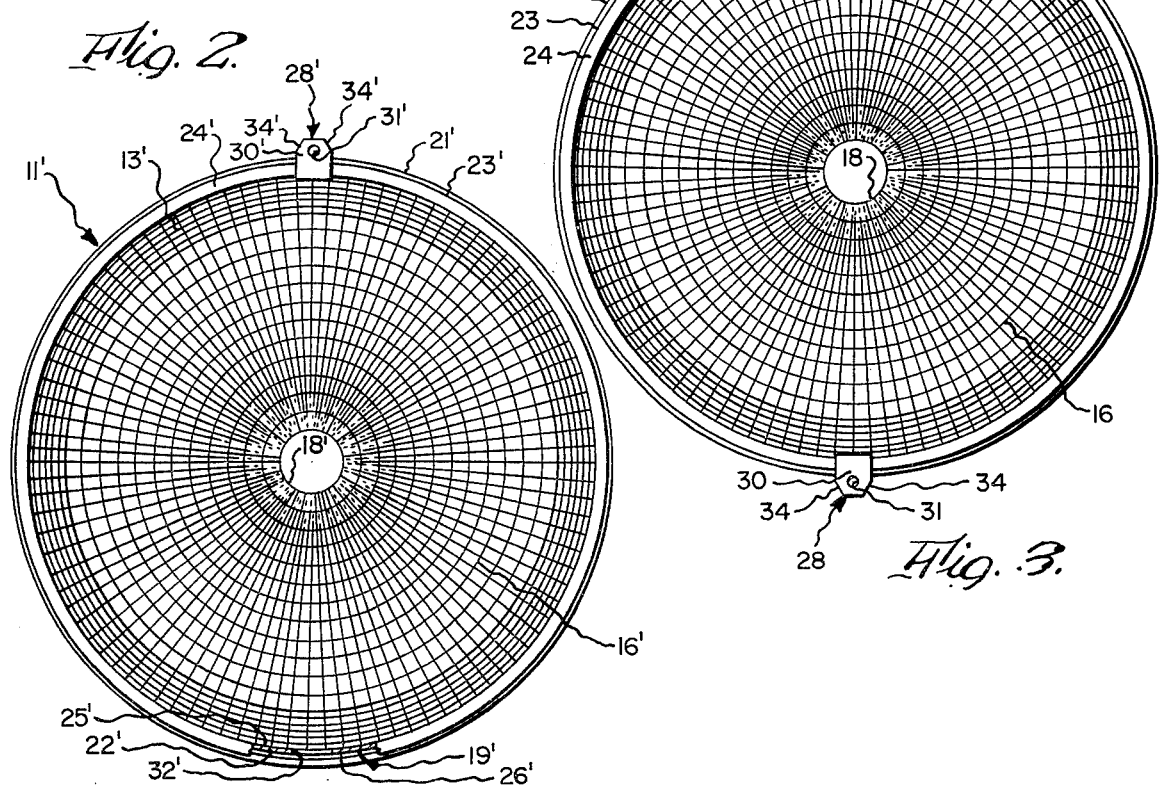
Fig. 2.
Fig. 3.

COUPLING DEVICE FOR A SECTIONAL MINNOW TRAP

BACKGROUND OF THE INVENTION

1. Field of the Invention

The present invention relates generally to a coupling device for joining the marginal end portion of a first tubular member with an adjacent marginal end portion of a second tubular member, and more particularly to an improved coupling device for joining the two halves of a Gee-type sectional minnow trap.

2. Description of the Prior Art

In the field of minnow traps, the type disclosed by Charles A. Gee in U.S. Pat. No. 798,670 has been particularly successful. This general type of trap, which still bears the name of the inventor, broadly comprises two identical frustoconical trap halves which may be joined together at their large diameter divergent ends. Gee's halves are provided at their outer small diameter convergent ends, with frusto-conical reentrant portions defining small diameter minnow inlet openings at their inward convergent ends. This type of trap also has the advantage that the two identical trap halves may be conveniently nested together for storage.

In addition to the express teaching of U.S. Pat. No. 798,670, additional structural details of this Gee-type sectional minnow trap may be found in U.S. Pat. Nos. 897,589, 2,076,972, and 3,387,403.

However, one problem that has persisted with this type of trap has been in the particular coupling device for joining the two trap halves together so that minnows will not be able to escape from the juncture between the halves. Gee's original design, still present in U.S. Pat. No. 3,387,403, contemplated that the trap halves be hinged together. Hence, Gee's snap fastener had to be capable of resisting multidirectional force components urging the trap halves to pivotally separate. Because of this, Gee was obliged to provide a specially configured snap fastener.

SUMMARY OF THE INVENTION

The present invention broadly provides an improved coupling device for joining the marginal end portion of a first tubular member with an adjacent marginal end portion of a second tubular member, and more particularly provides an improved coupling device for joining the two halves of a Gee-type sectional minnow trap.

The improved coupling device includes a first ring operatively mounted on the first tubular member proximate the end portion thereof, and having an interior surface and an annular end face; and a second ring operatively mounted on the second tubular member proximate the end portion thereof, and also having an interior surface and an annular end face. A hook member is suitably secured to each ring at one circumferential location. These hook members severally include a leg portion extending beyond the annular end face of the ring, and a hook portion extending away from the leg portion and spaced from the end face. Each of the rings is provided with a through-slot at a location diametrically opposite the location of its hook member. The two rings may be joined together by initially aligning the hook members of each ring with the cooperative slots provided through the other rings, and thereafter moving the tubular members relative to one another to cause each of the hook portions to pass simultaneously through the complementary slot provided through the other ring. If desired, the hook portions may be retained in this operative position by any type of retaining member adapted to prevent one of the hook portions from withdrawing from the cooperative slot.

Accordingly, one object of the present invention is to provide an improved coupling device for joining adjacent marginal end portions of two tubular members.

Another specific object is to provide an improved coupling device for joining the two halves of a sectional Gee-type minnow trap.

Another object is to provide an improved coupling device for a minnow trap which obviates the need for a hinged pivotal connection between the two trap halves.

Another object is to provide an improved coupling device for a sectional minnow trap which is adapted to permit the trap halves to separate upon only relative transverse movement therebetween.

Still another object is to provide an improved coupling device for a sectional minnow trap which is inexpensive to manufacture, provides identical nestable trap halves, and obviates the need for a specially configured snap fastener.

These and other objects and advantages will become apparent from the foregoing and ongoing written specification, the drawings, and the appended claims.

BRIEF DESCRIPTION OF THE DRAWINGS

FIG. 1 is an exterior side elevational view of a Gee-type sectional minnow trap embodying the improved coupling device, this view depicting the inventive coupling device as holding the two trap halves together in an assembled operative position.

FIG. 2 is a fragmentary transverse vertical sectional view thereof, taken generally on line 2—2 of FIG. 1, depicting the second ring mounted on the large diameter divergent end of the right trap half, this view showing the upper hook member in elevation and having a portion broken away to show the lower slot in transverse cross-section.

FIG. 3 is a fragmentary transverse vertical sectional view thereof, taken generally on line 3—3 of FIG. 1, depicting the first ring mounted on the large diameter divergent end of the left trap half, this view showing the lower hook member in elevation and having a portion broken away to show the upper slot in transverse cross-section.

DESCRIPTION OF THE PREFERRED EMBODIMENT

Figure 4:
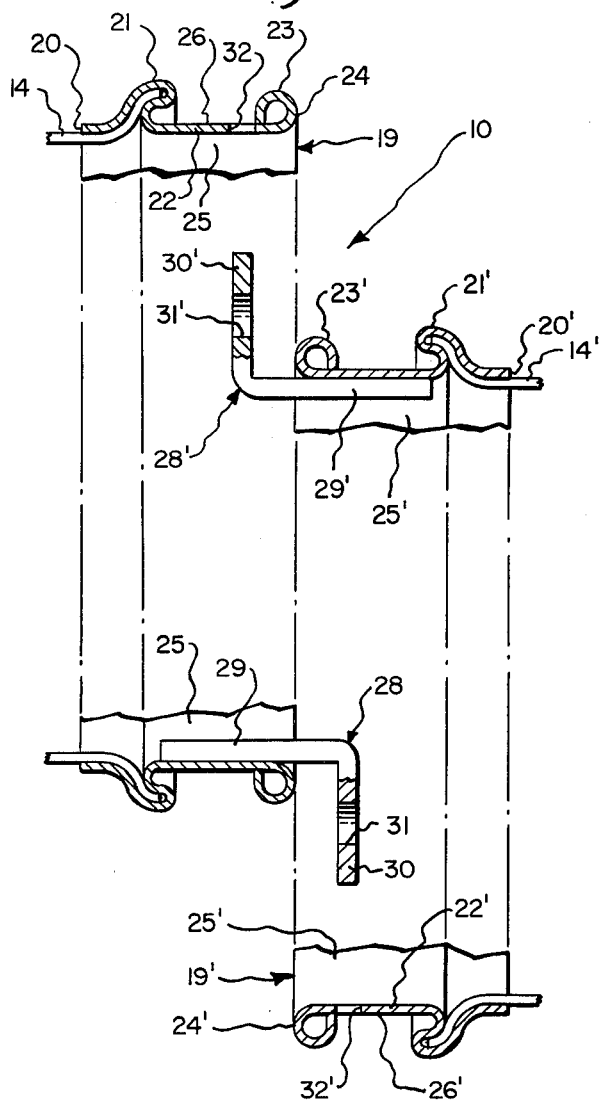
FIG. 4 is an enlarged fragmentary longitudinal vertical sectional view showing the left and right trap halves laterally misaligned such that the hook portion of each ring is depicted in exploded aligned relation to the cooperative slot provided through the other ring, this view illustrating the relative position of the trap halves prior to their being joined together.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring generally to the several drawing figures, the present invention broadly provides an improved coupling device for joining the marginal end portion of a first tubular member with an adjacent marginal end portion of a second tubular member.

While this inventive coupling has many potential uses and applications, a presently preferred embodiment of the improved coupling device, generally indicated at 10, is specifically illustrated as operatively joining the left and right tubular halves 11, 11' of a Gee-type sectional minnow trap, generally indicated at 12 and appropriately named after the inventor of U.S. Pat. No. 798,670. In this regard, it should be understood that these trap halves 11, 11' merely represent one specific form of tubular member.

Each of these trap halves 11, 11' is shown as including a frusto-conical tubular wall 13, 13' of a suitable wire mesh having a marginal end portion 14, 14' proximate its large diameter divergent end, an annular vertical collar 15, 15' at its opposite small diameter convergent end, and a reentrant frusto-conical wire mesh guide 16, 16' defining a small diameter minnow inlet opening 18, 18' at its inward convergent end (FIGS. 2 and 3), respectively.

It will be readily appreciated these two trap halves 11, 11' may be operatively joined together, as generally shown in FIG. 1, or selectively separated to enable a fisherman to bait the trap or to remove a catch of minnows therefrom. However, when the baited trap is placed in the water, it is important that the two trap halves 11, 11' be closely and securely joined together to prevent minnows from escaping through the juncture between the trap halves. Other specific details of the operation of this general type of sectional minnow trap may be found in U.S. Pat. Nos. 798,670, 2,076,972, and 3,387,403, the aggregate disclosures of which are hereby incorporated by reference.

Referring now to FIGS. 1 and 4, the improved coupling device 10 broadly includes a leftward first ring 19 mounted on the large diameter divergent marginal end portion 14 of left trap half 11, and a rightward second ring 19' mounted on the large diameter divergent marginal end portion 14' of right trap half 11', these rings 19, 19' being structurally identical to one another.

As best shown in FIG. 4, the left or first ring 19 has, from left to right in longitudinal cross-section, a leftward annular vertical rear edge 20, a rightwardly facing generally C-shaped receiver portion 21 having an upwardly and righwardly inclined annular recess into which the marginal end portion 14 of wire mesh wall 13 may be inserted and suitably anchored, a thin-walled cylindrical portion 22, a reversely rolled arcuate hollow bead 23, and a rightward annular vertical edge or end face 24. Conversely, the right or second ring 19' is shown as having, from right to left in longitudinal crosssection, a rightward annular vertical rear edge 20', a leftwardly facing generally C-shaped receiver portion 21' having an upwardly and leftwardly inclined annular recess into which the marginal end portion 14' of wire mesh wall 13' may be inserted and suitably anchored, a thin-walled cylindrical portion 22', a reversely rolled arcuate hollow bead 23', and a leftward annular vertical edge or end face 24'. These first and second rings 19, 19' are also shown as having interior surfaces 25, 25' and exterior surfaces 26, 26', respectively.

Figure 6:
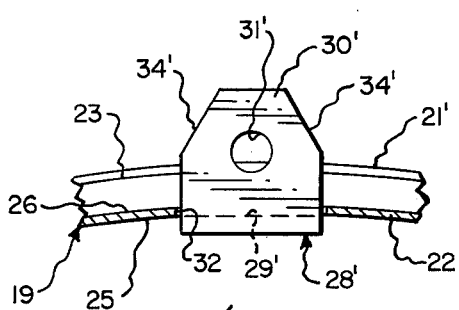
FIG. 6 is an enlarged fragmentary transverse vertical sectional view thereof, taken generally on line 6—6 of FIG. 5, illustrating the hook portion of the second ring hook member passed through the cooperative first ring slot.
Figure 7:
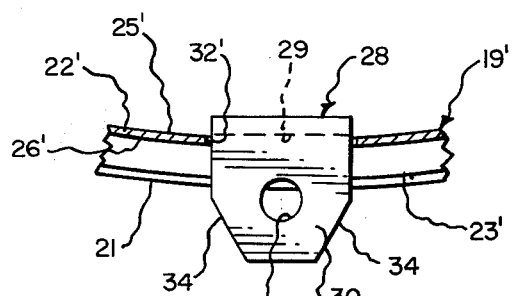
FIG. 7 is an enlarged fragmentary transverse vertical sectional view thereof, taken generally on line 7—7 of FIG. 5, illustrating the hook portion of the first ring hook member passed through the cooperative second ring slot.

In FIG. 4, the improved coupling device 10 is shown as further including generally L-shaped hook members 28, 28' mounted on the first and second rings 19, 19', respectively. On the first ring, the lower hook member 28 has a horizontal leg portion 29 arranged to contact interior surface 25 and suitably secured, as by spot welding, to the first ring 19; and a rightward depending vertical hook portion 30 extending downwardly away from leg portion 29 and spaced longitudinally from right end face 24 and suitably provided with a horizontal through hole 31 (FIG. 7). Conversely on the second ring, the upper hook member 28' has a horizontal leg portion 29' arranged to contact interior surface 25' and suitably secured, as by spot welding to the second ring 19', and a leftward upstanding vertical hook portion 30' extending upwardly away from leg portion 29' and spaced longitudinally from left end face 24' and suitably provided with a horizontal through hole 31' (FIG. 6).

Figure 5:
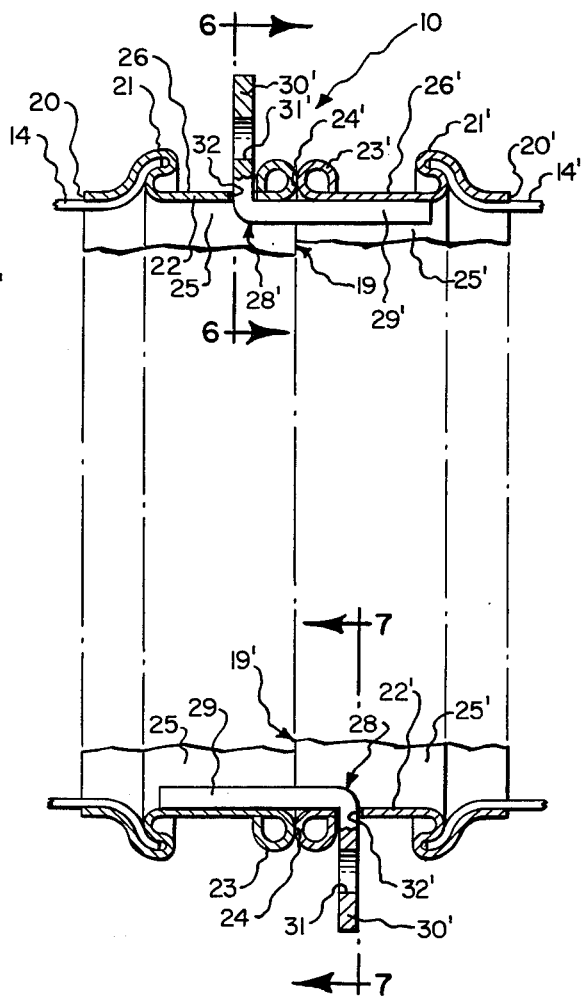
FIG. 5 is an enlarged fragmentary longitudinal vertical sectional view generally similar to FIG. 4, but showing the positions of the rings and the hook portions after the trap halves have been moved into an axially aligned relationship.

Referring now collectively to FIGS. 3, 4 and 5, the first ring 19 is shown further provided with a radially extending rectangular slot 32 through cylindrical portion 22 at a location diametrically opposite the location of hook member 28. Conversely, as shown in FIGS. 2,4 and 5, the second ring 19' is similarly provided with a radially extending rectangular slot 32' through cylindrical portion 22' at a location diametrically opposite the location of hook member 28'.

The two trap halves 11, 11' may be joined together by initially positioning these halves in a misaligned position, as shown in FIG. 4, with the upper hook portion 30' of the second ring 19' transversely aligned with the upper slot 32 provided through the first ring 19, and with the lower hook portion 30 of the first ring 19 transversely aligned with the lower slot 32' of the second ring 19'. Thereafter, these trap halves 11, 11' may be moved relative to one another to an axially aligned relationship (FIG. 5) such that upper hook portion 30' will be passed through upper slot 32, and lower hook portion 30 will be passed through lower slot 32', thereby joining the two trap halves.

To prevent unintended separation of the trap halves 11, 11', a suitable retaining member 33, depicted as being a conventional wire snap fastener, need be passed through only one of exposed holes 32, 32' (FIG. 1) to restrain both hook portions 30, 30' from withdrawing from their cooperative slots 32', 32, respectively. One principal advantage of the improved coupling device 10 lies in the fact that virtually any type of retaining member may be used, since this retaining member need only restrain unidirectional relative sliding movement between the trap halves, rather than multidirectional pivotal movement as contemplated by the structure disclosed in U.S. Pat. No. 798,670.

To facilitate insertion of the hook portions 30, 30' through their cooperative slots 32', 32, the hook portions 30, 30' may be optionally provided with tapered surfaces 34, 34', respectively, which serve to guide these hook portions through their complementary slots.

From the foregoing, it is apparent that the illustrated embodiment of the improved coupling device 10 includes the first ring 19 provided with a slot 32 and a diametrically opposite hook member 28, and a second ring 19' provided with a slot 32' and a diametrically opposite hook member 28'. The hook portions 30, 30' of hook members 28, 28' are adapted to be passed simultaneously through the cooperative slots 32', 32 provided through the other ring when the tubular trap halves are moved transversely relative to one another from the position depicted in FIG. 4 to the joined position depicted in FIG. 5.

While a preferred embodiment of the invention has been shown and described, it will be understood by persons skilled in this art that various additional changes and modifications may be made without departing from the spirit of the invention which is defined by the following claims.

What is claimed is:

1. In a sectional minnow trap including two halves, the improvement comprising an improved coupling device for releasably joining said halves, said device including: a first ring mounted on one of said halves and having a first annular end face; a second ring mounted on the other of said halves and having a second annular end face; each of said rings provided with a radially extending through slot at one circumferential location, and having a hook member arranged at another location diametrically opposite said one location, each of said hook members having a leg portion extending longitudinally beyond the end face of its ring and having a hook portion extending away from said leg portion in longitudinally spaced relation to the end face of its ring, whereby said hook portion of each of said rings may be simultaneously inserted through the slot in the other of said rings to releasably join said halves such that said first and second end faces may face one another.

2. The improvement as set forth in claim 1 wherein said first and second end faces may abut one another when said halves are joined together.

3. The improvement as set forth in claim 1 wherein each of said hook portions extends normally away from its leg portion.

4. The improvement as set forth in claim 3 wherein each of said hook members have an L-shaped longitudinal cross-section.

5. The improvement as set forth in claim 1 wherein at least one of said hook portions is provided with a through hole.

6. The improvement as set forth in claim 5 and further comprising:

a retaining member adapted to be passed through said hole when said halves are joined together to prevent said hook portions from withdrawing from said slots.

* * * * *